(12) United States Patent
Ogawa

(10) Patent No.: US 11,711,479 B2
(45) Date of Patent: Jul. 25, 2023

(54) PRINTING SYSTEM

(71) Applicant: RISO KAGAKU CORPORATION, Tokyo (JP)

(72) Inventor: Hideaki Ogawa, Tsukuba (JP)

(73) Assignee: RISO KAGAKU CORPORATION, Tokyo (JP)

( * ) Notice: Subject to any disclaimer, the term of this patent is extended or adjusted under 35 U.S.C. 154(b) by 654 days.

(21) Appl. No.: 16/724,717

(22) Filed: Dec. 23, 2019

(65) Prior Publication Data

US 2020/0239257 A1  Jul. 30, 2020

(30) Foreign Application Priority Data

Jan. 30, 2019 (JP) ................................. 2019-013715

(51) Int. Cl.
| | | |
|---|---|---|
| *B41J 3/60* | (2006.01) | |
| *B65H 85/00* | (2006.01) | |
| *G03G 15/00* | (2006.01) | |
| *H04N 1/23* | (2006.01) | |
| *B41J 13/00* | (2006.01) | |
| *B65H 15/00* | (2006.01) | |

(52) U.S. Cl.
CPC ........ *H04N 1/2369* (2013.01); *B41J 13/0045* (2013.01); *B65H 15/004* (2020.08); *B65H 2301/33214* (2013.01)

(58) Field of Classification Search
CPC ....... B41J 3/60; B41J 13/0045; G03G 15/238; G03G 2215/00021; B65H 29/60; B65H 85/00; B65H 15/004; B65H 2301/33214
See application file for complete search history.

(56) References Cited

U.S. PATENT DOCUMENTS

| | | |
|---|---|---|
| 5,889,594 A | 3/1999 | Maekawa |
| 9,146,702 B2 | 9/2015 | Ogawa |

(Continued)

FOREIGN PATENT DOCUMENTS

| | | |
|---|---|---|
| EP | 3109049 A1 | 12/2016 |
| JP | 2004-12982 A | 1/2004 |

(Continued)

OTHER PUBLICATIONS

Feb. 1, 2021 Chinese Office Action in corresponding Chinese Application No. 201911391468.7 and English translation thereof.

(Continued)

*Primary Examiner* — Luis A Gonzalez
(74) *Attorney, Agent, or Firm* — Greenblum & Bernstein, P.L.C.

(57) ABSTRACT

A printing system includes: a first printing unit that performs printing on a medium on the basis of first printing data; a first inventing unit that is located downstream from the first printing unit in a transportation direction specific to the medium and performs an inverting operation that is an operation of inverting front and back sides of the medium; a second printing unit that is located downstream from the first inverting unit in the transportation direction and performs printing on the medium on the basis of second printing data; and a control unit that determines whether the first inverting unit needs to perform the inverting operation, on the basis of whether the second printing data indicates a printing page for the front or back side of the medium.

7 Claims, 14 Drawing Sheets

(56) References Cited

U.S. PATENT DOCUMENTS

| | | | | |
|---|---|---|---|---|
| 2006/0233569 A1* | 10/2006 | Furst | ................... | G03G 15/234 |
| | | | | 399/162 |
| 2010/0007902 A1 | 1/2010 | Kikuchi | | |
| 2012/0051814 A1 | 3/2012 | Fukamachi | | |
| 2012/0087690 A1* | 4/2012 | Kudo | ................... | G03G 15/238 |
| | | | | 399/82 |
| 2012/0262745 A1* | 10/2012 | Mitsui | ................ | G03G 21/1604 |
| | | | | 358/1.12 |
| 2012/0288290 A1* | 11/2012 | Hano | ................ | G03G 15/2039 |
| | | | | 399/49 |
| 2019/0232688 A1 | 8/2019 | Ogawa | | |

FOREIGN PATENT DOCUMENTS

| | | |
|---|---|---|
| JP | 2010-020578 | 1/2010 |
| JP | 2012-048059 | 3/2012 |
| JP | 2013-220607 A | 10/2013 |
| JP | 2014-115382 A | 6/2014 |
| JP | 2017-036138 | 2/2017 |

OTHER PUBLICATIONS

Jun. 24, 2020 Extended European Search Report in European Application No. EP 19219970.1.

Sep. 6, 2022 Japanese Office Action in Japanese Application No. JP2019-013715 and English translation thereof.

\* cited by examiner

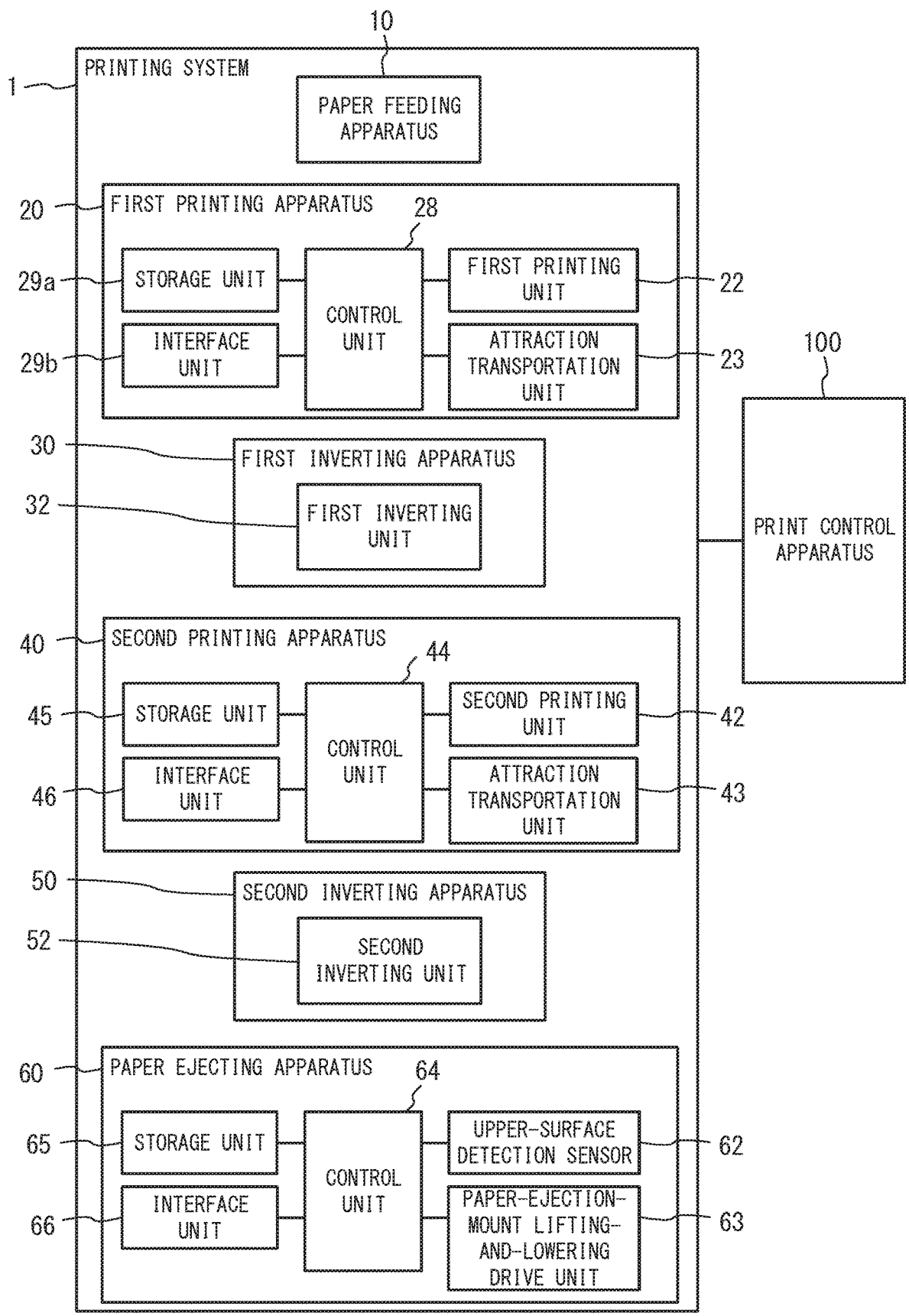
F I G. 2

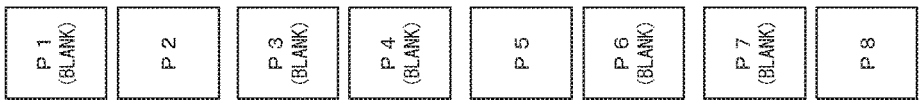
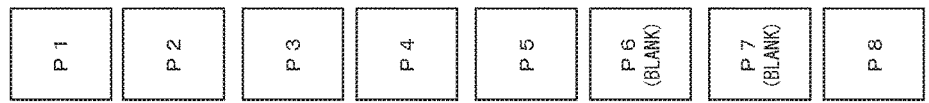
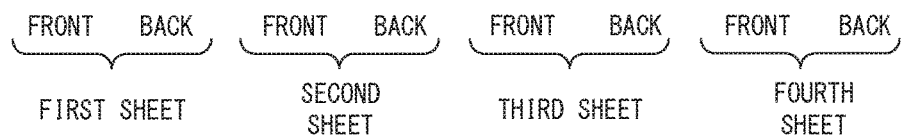
FIG. 3

| INPUT INFORMATION OF FIRST PRINTING APPARATUS | | | OUTPUT INFORMATION OF FIRST PRINTING APPARATUS |
|---|---|---|---|
| PAGE NUMBER | EJECTION SCHEME | PRINTING PERFORMED BY SECOND PRINTING APPARATUS | WHETHER FIRST INVERTING APPARATUS PERFORMS INVERTING OPERATION |
| P1, P2 | FACEDOWN | BACK SIDE | NO |
| P3, P4 | FACEDOWN | NO | NO |
| P5, P6 | FACEDOWN | FRONT SIDE | YES |
| P7, P8 | FACEDOWN | BACK SIDE | NO |

FIG. 5

| OUTPUT INFORMATION OF SECOND PRINTING APPARATUS | | | OUTPUT INFORMATION OF SECOND PRINTING APPARATUS |
|---|---|---|---|
| PAGE NUMBER | EJECTION SCHEME | PRINTING PERFORMED BY SECOND PRINTING APPARATUS | WHETHER SECOND INVERTING APPARATUS PERFORMS INVERTING OPERATION |
| P1, P2 | FACEDOWN | BACK SIDE | NO |
| P3, P4 | FACEDOWN | NO | NO |
| P5, P6 | FACEDOWN | FRONT SIDE | YES |
| P7, P8 | FACEDOWN | BACK SIDE | NO |

FIG. 6

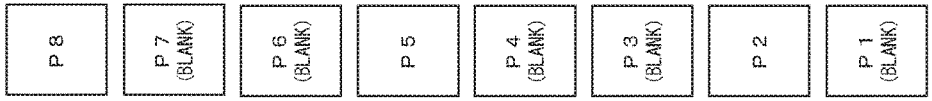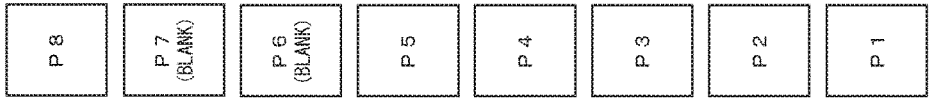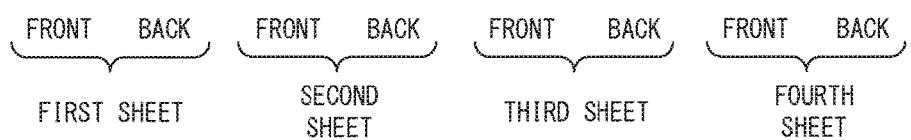
FIG. 7

| INPUT INFORMATION OF FIRST PRINTING APPARATUS | | | OUTPUT INFORMATION OF FIRST PRINTING APPARATUS |
|---|---|---|---|
| PAGE NUMBER | EJECTION SCHEME | PRINTING PERFORMED BY SECOND PRINTING APPARATUS | WHETHER FIRST INVERTING APPARATUS PERFORMS INVERTING OPERATION |
| P1, P2 | FACEUP | FRONT SIDE | YES |
| P3, P4 | FACEUP | NO | NO |
| P5, P6 | FACEUP | BACK SIDE | NO |
| P7, P8 | FACEUP | FRONT SIDE | YES |

F I G. 9

| INPUT INFORMATION OF SECOND PRINTING APPARATUS | | | OUTPUT INFORMATION OF SECOND PRINTING APPARATUS |
|---|---|---|---|
| PAGE NUMBER | EJECTION SCHEME | PRINTING PERFORMED BY SECOND PRINTING APPARATUS | WHETHER SECOND INVERTING APPARATUS PERFORMS INVERTING OPERATION |
| P1, P2 | FACEUP | FRONT SIDE | YES |
| P3, P4 | FACEUP | NO | NO |
| P5, P6 | FACEUP | BACK SIDE | NO |
| P7, P8 | FACEUP | FRONT SIDE | YES |

FIG. 10

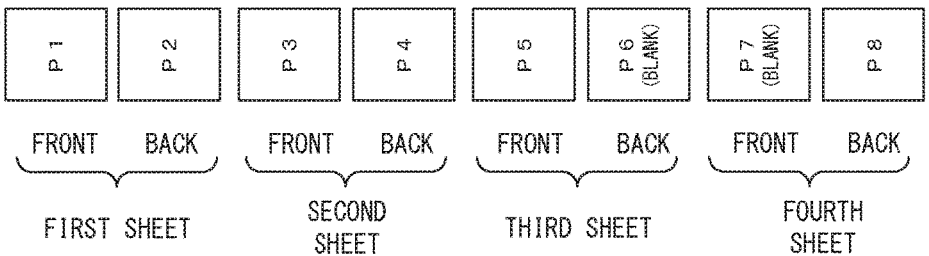
FIG. 11

| INPUT INFORMATION OF FIRST PRINTING APPARATUS | | | OUTPUT INFORMATION OF FIRST PRINTING APPARATUS |
|---|---|---|---|
| PAGE NUMBER | EJECTION SCHEME | PRINTING PERFORMED BY SECOND PRINTING APPARATUS | WHETHER FIRST INVERTING APPARATUS PERFORMS INVERTING OPERATION |
| P1, P2 | FACEDOWN | BOTH SIDES | YES |
| P3, P4 | FACEDOWN | NO | NO |
| P5, P6 | FACEDOWN | FRONT SIDE | YES |
| P7, P8 | FACEDOWN | BOTH SIDES | YES |

F I G. 1 3

| INPUT INFORMATION OF SECOND PRINTING APPARATUS | | | OUTPUT INFORMATION OF SECOND PRINTING APPARATUS |
|---|---|---|---|
| PAGE NUMBER | EJECTION SCHEME | PRINTING PERFORMED BY SECOND PRINTING APPARATUS | WHETHER SECOND INVERTING APPARATUS PERFORMS INVERTING OPERATION |
| P1, P2 | FACEDOWN | BOTH SIDES | NO |
| P3, P4 | FACEDOWN | NO | NO |
| P5, P6 | FACEDOWN | FRONT SIDE | NO |
| P7, P8 | FACEDOWN | BOTH SIDES | NO |

FIG. 14

PRINTING SYSTEM

CROSS-REFERENCE TO RELATED APPLICATION

This application is based upon and claims the benefit of priority of the prior Japanese Patent Application No. 2019-013715, filed on Jan. 30, 2019, the entire contents of which are incorporated herein by reference.

FIELD

The aspects described herein are related to a printing system that includes a plurality of printing units.

BACKGROUND

Known conventional printing systems include a plurality of printing apparatuses disposed in series with a direction in which sheets are transported. Such printing systems include a known printing system wherein an inverting apparatus located between first and second printing apparatuses inverts the front and back sides sheets (e.g., Japanese Laid-open Patent Publication No. 2013-220607).

SUMMARY

In one aspect, a printing system includes: a first printing unit that performs printing on a medium on the basis of first printing data; a first inventing unit that is located downstream from the first printing unit in a transportation direction specific to the medium and performs an inverting operation that is an operation of inverting front and back sides of the medium; a second printing unit that is located downstream from the first inverting unit in the transportation direction and performs printing on the medium on the basis of second printing data; and a control unit that determines whether the first inverting unit needs to perform the inverting operation, on the basis of whether the second printing data indicates a printing page for the front or back side of the medium.

The object and advantages of the invention will be realized by means of the elements and combinations particularly pointed out in the claims.

BRIEF DESCRIPTION OF DRAWINGS

FIG. 2 illustrates the main control configuration of a printing system in an embodiment;

FIG. 3 is an explanatory diagram indicating image data received by first and second printing apparatuses when a facedown ejection scheme is used in an embodiment;

FIG. 5 illustrates a table indicating determination conditions referred to by a first printing apparatus when a facedown ejection scheme is used in an embodiment;

FIG. 6 illustrates a table indicating determination conditions referred to by a second printing apparatus when a facedown ejection scheme is used in an embodiment;

FIG. 7 is an explanatory diagram indicating image data received by first and second printing apparatuses when a faceup ejection scheme is used in an embodiment;

FIG. 9 illustrates a table indicating determination conditions referred to by a first printing apparatus when a faceup ejection scheme is used in an embodiment;

FIG. 10 illustrates a table indicating determination conditions referred to by a second printing apparatus when a faceup ejection scheme is used in an embodiment;

FIG. 11 is an explanatory diagram indicating image data received by first and second printing apparatuses when a facedown ejection scheme is used in a variation of an embodiment;

FIG. 13 illustrates a table indicating determination conditions referred to by a first printing apparatus when a facedown ejection scheme is used in a variation of an embodiment; and FIG. 14 illustrates a table indicating determination conditions referred to by a second printing apparatus when a facedown ejection scheme is used in a variation of an embodiment.

DESCRIPTION OF EMBODIMENTS

Figure 1:
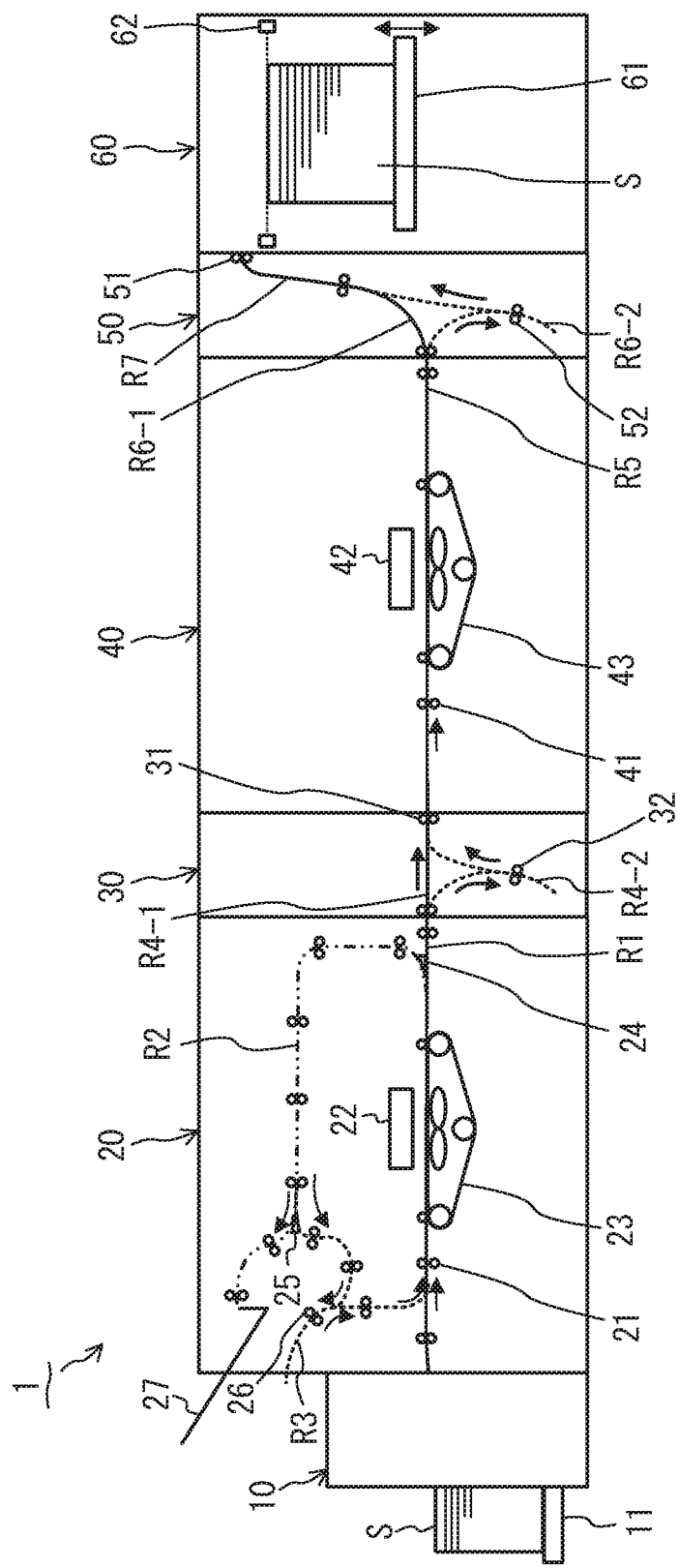
FIG. 1 is a configuration diagram illustrating a printing system in accordance with an embodiment.

In the meantime, a sheet (medium) on which a first printing apparatus located on the upstream side in a transportation direction has performed both-side printing by using inks with fundamental colors such as CMYK and gray could undergo one-side printing performed by a second printing apparatus on the downstream side by using special color inks and a magnetic ink such as a magnetic-ink-character-recognition (MICR) ink. When such a printing process is performed, job settings, image data, and the like are reported from a print control apparatus (raster-image-processor (RIP) controller) such as a personal computer to each of the first and second printing apparatuses.

However, an inverting apparatus disposed between the first and second printing apparatuses as in the example described above cannot determine according to the job settings reported to each of the first and second printing apparatuses whether to invert the front and back sides of the sheet.

For the inverting operation performed by an inverting apparatus, print forms for which the number of pages to be processed per set within a print job is fixed could be used so that whether the inverting apparatus needs to perform the inverting operation can be standardized on a print-job by print-job basis. In this case, however, when printing needs to be performed for a job with a variable number of pages to be processed per set so as to create, for example, billing statements, the user will need to edit job data in accordance with the number of pages, and this could increase the time required for preparation of the printing process by several hours.

In one possible way, a print control apparatus may determine whether an inverting operation needs to be performed. However, pages will need to be assigned to a first printing apparatus located upstream and a second printing apparatus located downstream concurrently with determining whether the inverting operation needs to be performed on a page-by-page basis with the characteristics of a transportation mechanism grasped; and if the print control apparatus is equipped with functions for mechanically controlling the printing apparatuses, i.e., functions which would not be provided in normal cases, this could result in the need to perform complicated control operations and thus cause some faults, thereby increasing development costs.

The following describes a printing system in accordance with embodiments of the present invention by referring to the drawings.

FIG. 1 is a configuration diagram illustrating a printing system 1 in accordance with an embodiment.

FIG. 2 illustrates the main control configuration of the printing system 1.

As depicted in FIGS. 1 and 2, the printing system 1 includes a paper feeding apparatus 10, a first printing apparatus 20, a first inverting apparatus 30, a second printing apparatus 40, a second inverting apparatus 50, and a paper ejecting apparatus 60.

The printing system 1 receives first printing data for the first printing apparatus 20 and second printing data for the second printing apparatus 40 from a print control apparatus 100 such as a personal computer (user terminal) that functions as a RIP controller. For example, the first and second printing data may each include image data and a print mode (job settings). A system that includes the printing system 1 and the print control apparatus 100 is defined as a print control system.

The paper feeding apparatus 10, the first printing apparatus 20, the first inverting apparatus 30, the second printing apparatus 40, the second inverting apparatus 50, and the paper ejecting apparatus 60 are disposed in series with transportation paths for sheets S, i.e., exemplary media. At least two of the paper feeding apparatus 10, the first printing apparatus 20, the first inverting apparatus 30, the second printing apparatus 40, the second inverting apparatus 50, and the paper ejecting apparatus 60 may be integrally disposed within the same housing.

FIG. 1 depicts direct-advance transportation paths R1, R4-1, R5, and R6-1 and an ejection path R7 for sheets S with solid lines, a circulation transportation path R2 for the sheets S with a two-dot dash line, and inversion transportation paths R3, R4-2, and R6-2 for the sheets S with broken lines.

The paper feeding apparatus 10 depicted in FIG. 1 is an exemplary medium supply apparatus. The paper feeding apparatus 10 includes a paper feed mount 11 on which sheets S before printing are to be placed. Although not illustrated, the paper feeding apparatus 10 has disposed thereon a paper feeding roller for drawing out and transporting a sheet S at the top of the plurality of sheets S placed on the paper feed mount 11 and a supply drive means (actuator) such as a motor for driving the paper feeding roller.

As depicted in FIG. 1, the first printing apparatus 20 includes a plurality of transportation roller pairs 21, a first printing unit 22, an attraction transportation unit 23, transportation-path switching units 24 and 25, a switchback roller pair 26, and a paper ejection mount 27. As depicted in FIG. 2, the first printing apparatus 20 further includes a control unit 28, a storage unit 29a, and an interface unit 29b.

The plurality of transportation roller pairs 21 disposed within the first printing apparatus 20 transport a sheet S in a nipping manner.

The first printing unit 22 performs both-side printing on a sheet S on the basis of first printing data received from the print control apparatus 100. The first printing unit 22 performs printing on a sheet S by using inks with fundamental colors such as CMYK and gray. For example, the first printing unit 22 may include a line-head-type inkjet head (not illustrated) for colors to be used for printing. The first printing unit 22 may use printing schemes other than the inkjet printing scheme.

The attraction transportation unit 23 faces the first printing unit 22. The attraction transportation unit 23 transports a sheet S by means of a belt while attracting this sheet thereto. The attraction transportation unit 23 is an exemplary transportation means for transporting a sheet S.

The transportation-path switching unit 24 switches between the direct-advance transportation path R1, which leads to the first inverting apparatus 30, and the circulation transportation path R2, which leads to the paper ejection mount 27 and the inversion transportation path R3, for a transportation path on which a sheet S is to be transported after undergoing one-side printing performed by the first printing unit 22. In the present embodiment, as the first printing unit 22 performs both-side printing, the transportation-path switching unit 24 switches the transportation path for a sheet S to the circulation transportation path R2 after the sheet S has undergone one-side printing and switches the transportation path for a sheet S to the direct-advance transportation path R1 after the sheet S has undergone both-side printing.

The transportation-path switching unit 25 switches between, for a sheet S transmitted from the circulation transportation path R2, a transportation path leading to the paper ejection mount 27 and a transportation path leading to the inversion transportation path R3, which inverts the front and back sides of the sheet S by means of the switchback roller pair 26. In the present embodiment, as the first printing unit 22 performs both-side printing, the transportation-path switching unit 25 sets the transportation path leading to the inversion transportation path R3 for a sheet S transported from the circulation transportation path R2. After the front and back sides of the sheet S are inverted by the inversion transportation path R3, the sheet S is transported to the first printing unit 22 again.

Sheets S that are not to be ejected to the paper ejecting apparatus 60 are placed on the paper ejection mount 27.

The control unit 28 depicted in FIG. 2, which includes a processor (e.g., central processing unit (CPU)) for functioning as an arithmetic processing unit, controls operations of the components of the first printing apparatus 20, determines whether a first inverting unit 32 of the first inverting apparatus 30 needs to perform an inverting operation, and controls the inverting operation performed by the first inverting unit 32. Another control unit of the printing system 1, such as a control unit provided for the first inverting apparatus 30, may determine whether the first inverting unit 32 needs to perform the inverting operation.

The printing system 1 includes the control unit 28 of the first printing apparatus 20, a control unit 44 of the second printing apparatus 40 (this control unit will be described hereinafter), and a control unit 64 of the paper ejecting apparatus 60 (this control unit will be described hereinafter), and these control units may be collectively referred to as a control unit for the printing system 1 or may each be referred to as a control unit for the printing system 1. The printing system 1 may include a control unit that functions as at least two of the control unit 28 of the first printing apparatus 20, the control unit 44 of the second printing apparatus 40, the control unit 64 of the paper ejecting apparatus 60, and the like.

For example, the storage unit 29a may be a read only memory (ROM) that is a read-only semiconductor memory having a predetermined control program recorded therein in advance or a random access memory (RAM) that is a semiconductor memory capable of being occasionally written or read to be used as a working storage on an as-needed basis when a professor runs various control programs.

The interface unit 29b communicates various information with, for example, the components of the print control apparatus 100 and the printing system 1.

As depicted in FIG. 1, the first inverting apparatus 30 includes a plurality of transportation roller pairs 31 and the first inverting unit 32.

The transportation roller pairs 31 transport a sheet S ejected from the first printing apparatus 20 in a nipping manner.

A transportation-path switching mechanism (not illustrated) of the first inverting apparatus 30 switches between the direct-advance transportation path R4-1, which transports a sheet S ejected from the first printing apparatus 20 directly to the second printing apparatus 40, and the inversion transportation path R4-2, which inverts the front and back sides of the sheet S. The inversion transportation path R4-2 has disposed thereat the first inverting unit 32, which includes a switchback roller pair and an inversion drive means (actuator) for driving the switchback roller pair. The first inverting apparatus 30 is positioned downstream from the first printing apparatus 20 in the transportation direction of the sheet S. Hence, the first inverting unit 32 is positioned downstream from the first printing unit 22 in the transportation direction.

As depicted in FIG. 1, the second printing apparatus 40 includes a plurality of transportation roller pairs 41, a second printing unit 42, and an attraction transportation unit 43. As depicted in FIG. 2, the second printing apparatus 40 further includes a control unit 44, a storage unit 45, and an interface unit 46.

The transportation roller pairs 41 disposed within the second printing apparatus 40 transport a sheet S in a nipping manner.

The second printing unit 42 performs one-side printing on a sheet S on the basis of second printing data received from the print control apparatus 100. The second printing unit 42 performs printing on a sheet S by using magnetic inks such as MICR inks. The second printing unit 42 may perform printing on a sheet S by using, for example, UV inks or special color inks having colors other than fundamental colors, such as a transparent ink. The inks used by the second printing unit 42, such as magnetic inks, are exemplary types of inks different from the inks used by the first printing unit 22 (inks having fundamental colors such as CMYK). When the second printing unit 42 uses a magnetic ink for printing, a mechanism for agitating the ink may be provided to reduce sedimentation of components.

The second printing unit 42 includes a line-head-type inkjet head. The second printing unit 42 may use printing schemes other than the inkjet printing scheme. The second printing apparatus 40 is positioned downstream from the first inverting apparatus 30 in the transportation direction of a sheet S. Hence, the second printing unit 42 is positioned downstream from the first inverting unit 32 in the transportation direction.

The attraction transportation unit 43 faces the second printing unit 42. The attraction transportation unit 43 transports a sheet S by means of a belt while attracting this sheet thereto. The attraction transportation unit 43 is an exemplary transportation means for transporting a sheet S.

As with the first printing apparatus 20, the second printing apparatus 40 may include transportation-path switching units 24 and 25, a switchback roller pair 26, a paper ejection mount 27, and the like and be capable of performing both-side printing on a sheet S. However, the present embodiment will be described with reference to control operations for determining on the basis of second printing data directed to one-side printing whether the first inverting unit 32 needs to perform the inverting operation when the second printing unit 42 performs printing on a sheet S on the basis of the second printing data.

The control unit 44 depicted in FIG. 2, which includes a processor (e.g., CPU) that functions as an arithmetic processing unit, controls operations of the components of the second printing apparatus 40, determines whether the second inverting apparatus 50 needs to perform the inverting operation, and controls the inverting operation.

For example, the storage unit 45 may be a ROM that is a read-only semiconductor memory having a predetermined control program recorded therein in advance or a RAM that is a semiconductor memory capable of being occasionally written or read to be used as a working storage on an as-needed basis when a professor runs various control programs.

The interface unit 46 communicates various information with, for example, the components of the print control apparatus 100 and the printing system 1.

As depicted in FIG. 1, the second inverting apparatus 50 includes a plurality of transportation roller pairs 51 and a second inverting unit 52.

The transportation roller pairs 51 transport a sheet S ejected from the second printing apparatus 40 in a nipping manner.

A transportation-path switching mechanism (not illustrated) of the second inverting apparatus 50 switches between the direct-advance transportation path R6-1, which transports a sheet S ejected from the second printing apparatus 40 directly to the paper ejecting apparatus 60, and the inversion transportation path R6-2, which inverts the front and back sides of the sheet S. The inversion transportation path R6-2 has disposed thereat the second inverting unit 52, which includes a switchback roller pair and an inversion drive means (actuator) for driving the switchback roller pair.

The second inverting apparatus 50 is positioned downstream from the second printing apparatus 40 in the transportation direction of the sheet S. Hence, the second inverting unit 52 is positioned downstream from the second printing unit 42 in the transportation direction.

The paper ejecting apparatus 60 includes a paper ejection mount 61, an upper-surface detection sensor 62, and a paper-ejection-mount lifting-and-lowering drive unit 63 depicted in FIG. 2. The paper ejecting apparatus 60 is an exemplary medium ejection apparatus to which sheets S that have undergone printing are ejected.

Sheets S ejected from the second inverting apparatus 50, i.e., sheets S that have undergone printing, are sequentially placed onto the paper ejection mount 61. The paper ejection mount 61 is lifted or lowered by a driving operation performed by the paper-ejection-mount lifting-and-lowering drive unit 63. The paper ejection mount 61 may be a belt conveyer or roller conveyer on which sheets S are placed, i.e., a paper ejection mount that includes a transportation means.

The upper-surface detection sensor 62 is a sensor for detecting the height of a placement surface provided by the paper ejection mount 61, i.e., the height of the uppermost sheet S (the height of the upper surface of the paper ejection mount 61 when no sheets S are placed). For example, the upper-surface detection sensor 62 may include a light emission unit that emits horizontally traveling light (represented as a dotted line in FIG. 1) at a height such that a desired placement surface can be achieved, and a light reception unit that receives the light. When light emitted from the light emission unit of the upper-surface detection sensor 62 is blocked by sheets S and thus is not received by the light reception unit of the upper-surface detection sensor 62, the control unit 64 (this unit will be described hereinafter) controls the paper-ejection-mount lifting-and-lowering drive unit 63 so as to lower the paper ejection mount 61 by, for example, a distance equivalent to the total width of several sheets S.

The paper-ejection-mount lifting-and-lowering drive unit 63 depicted in FIG. 2 lifts or lowers the paper ejection mount 61. For example, the paper-ejection-mount lifting-and-lowering drive unit 63 may be an actuator such as a motor.

The control unit 64, which includes a processor (e.g., CPU) that functions as an arithmetic processing unit, controls operations of the components of the paper ejecting apparatus 60.

For example, a storage unit 65 may be a ROM that is a read-only semiconductor memory having a predetermined control program recorded therein in advance or a RAM that is a semiconductor memory capable of being occasionally written or read to be used as a working storage on an as-needed basis when a professor runs various control programs.

An interface unit 66 communicates various information with, for example, the components of the print control apparatus 100 and the printing system 1.

First, descriptions will be given in the following of operations performed by the printing system 1 when a facedown ejection scheme (printing order) is used, i.e., when an ejection scheme is used wherein sheets S are ejected onto the paper ejection mount 61 in a manner such that sheets S with a lower page number are located at lower levels on the paper ejection mount 61 by performing printing in an order starting from the lowest page number.

Figure 4:
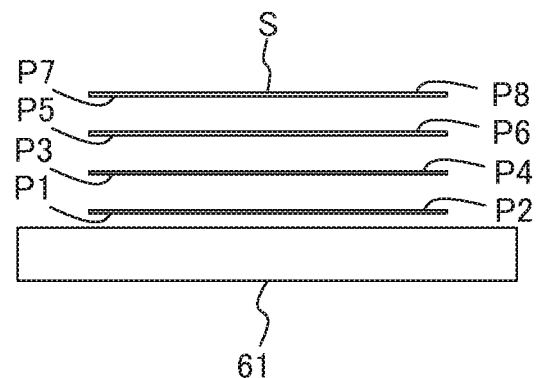
FIG. 4 is an explanatory diagram indicating a sheet ejection state achieved when a facedown ejection scheme is used in an embodiment.

FIG. 3 is an explanatory diagram indicating image data received by the first and second printing apparatuses 20 and 40 when the facedown ejection scheme is used. FIG. 4 is an explanatory diagram indicating a sheet ejection state achieved when the facedown ejection scheme is used.

First and second printing data respectively transmitted to the first printing apparatus 20 and the second printing apparatus 40 from the print control apparatus 100 depicted in FIG. 2 each include image data and a print mode that includes information indicating whether both-side printing or one-side printing is to be performed and indicating which of the face down ejection scheme or the faceup ejection scheme is to be used. In one example, the first printing data and the second printing data may each correspond to one print job directed to eight pages.

As depicted in FIG. 3, the image data of the first printing data received by the first printing apparatus 20 includes image data of pages P1-P8, of which pages P6 and P7 are nonprinting pages, i.e., blank pages having no objects to be printed. When the first printing apparatus 20 performs both-side printing on the sheets S, printing is performed in order starting from page P1. Pages P1 and P2 correspond to the front and back sides of a first sheet S. Similarly, pages P3 and P4, pages P5 and P6, and pages P7 and P8 respectively correspond to the front and back sides of second to fourth sheets S. Hence, when the first printing apparatus 20 performs both-side printing on the sheets S, image data of pages P1, P3, P5, and P7 are printed on the front sides of the first to fourth sheets S, and image data of pages P2, P4, P6, and P8 are printed on the back sides of the first to fourth sheets S.

When the first printing apparatus 20 performs one-side printing, not both-side printing, on the sheets S, i.e., when the sheets S are transported to the first inverting apparatus 30 after undergoing one-side printing performed by the first printing unit 22 without being transported via the circulation transportation path R2 or the inversion transportation path R3, image data of pages P1, P3, P5, and P7 are printed on the front sides of the first to fourth sheets S, and then the sheets S are transported to the first inverting apparatus 30 with the front sides thereof as printing sides (upper sides). When the first printing apparatus 20 performs both-side printing on the sheets S, image data of pages P1, P3, P5, and P7 are printed on the front sides of the first to fourth sheets S, and then the front and back sides of the sheets S are inverted by the switchback roller pair 26 at the inversion transportation path R3 for printing on the back sides, with the result that the sheets S are transported to the first inverting apparatus 30 with the back sides thereof as printing sides (upper sides). In this way, the sheets S are transported to the first inverting apparatus 30 with the front sides thereof as printing sides when the first printing apparatus 20 performs one-side printing, and the sheets S are transported to the first inverting apparatus 30 with the back sides thereof as printing sides when the first printing apparatus 20 performs both-side printing. Accordingly, opposite determinations are made as to whether the first inverting unit 32 needs to perform the inverting operation, in accordance with whether the first printing apparatus 20 performs both-side printing or one-side printing.

After performing printing for page P5, i.e., the front side of the third sheet S, the first printing apparatus 20 does not perform printing for page P6, i.e., the back side of the third sheet S. Hence, the first printing apparatus 20 may transport the third sheet S to the first inverting apparatus 30 without transporting this sheet again to the first printing unit 22 via the circulation transportation path R2 and the inversion transportation path R3. However, the present embodiment is described herein with reference to an example in which even when printing is not performed for page P6, i.e., the back side of the third sheet S, this sheet passes by the first printing unit 22 after being transported thereto via the circulation transportation path R2 and the inversion transportation path R3. When the third sheet S is transported directly to the first inverting apparatus 30 after printing is performed for page P5, i.e., the front side of the third sheet S, "YES" or "NO" may be set as to whether the first inverting unit 32 needs to perform the inverting operation, in a manner opposite to the manner in which "YES" or "NO" would be set if the third sheet S was transported to the circulation transportation path R2 and the invention transportation path R3 ("NO" is set in opposition to "YES", or "YES" is set in opposition to "NO").

The second printing apparatus 40 performs one-side printing on the sheets S. The print control apparatus 100 generates image data of second printing data with blank pages inserted into nonprinting pages (P1, P3, P4, P6, P7) for which printing is not to be performed, whereby the image data of the second printing data has as many pages as the first printing data directed to both-side printing (has pages P1-P8). Thus, the printing pages, i.e., the pages other than the nonprinting pages, are pages P2, P5, and P8.

As depicted in FIG. 4, the four sheets S with pages P1-P8 having undergone printing are placed on the paper ejection mount 61 of the paper ejecting apparatus 60 with the bottom side of the lowermost sheet S being page P1 and the upper side of the uppermost sheet S being page P8.

FIG. 5 illustrates a table indicating determination conditions referred to by the first printing apparatus 20 when the facedown ejection scheme is used. FIG. 6 illustrates a table indicating determination conditions referred to by the second printing apparatus 40 when the facedown ejection scheme is used.

As depicted in FIG. 5, the first printing apparatus 20 receives, from the print control apparatus 100 depicted in FIG. 2, second printing data in addition to first printing data that includes image data and a print mode. The first printing apparatus 20 may receive the second printing data indirectly from the print control apparatus 100 via the second printing apparatus 40. The second printing data received by the first printing apparatus 20 may include image data alone.

The control unit 28 of the first printing apparatus 20 refers to the image data in the second printing data so as to determine whether the first inverting unit 32 needs to perform the inverting operation, at least on the basis of which of the front or back side of a sheet S the printing page on one side in the second printing data indicates.

For example, the control unit 28 may determine whether the first inverting unit 32 needs to perform the inverting operation on the basis of three factors: which of the front or back side of a sheet S the printing page on one side in the second printing data indicates, which of both-side printing or one-side printing the first printing data is directed to, and which of the facedown ejection scheme or the faceup ejection scheme is to be used.

In the example indicated in FIG. 5, the first printing apparatus 20 performs both-side printing, and the facedown ejection scheme is used. Hence, the control unit 28 determines whether the first inverting unit 32 needs to perform the inverting operation, in the manner described in the following.

Regarding pages P1, P2, P7, and P8, as depicted in FIG. 5, pages P2 and P8, i.e., back sides, are set as printing pages for the second printing apparatus 40. The back sides are set as printing sides (upper sides) for the first printing apparatus 20 because the sheets S are inverted once for both-side printing. Accordingly, the control unit 28 sets "NO" as to whether the first inverting unit 32 needs to perform the inverting operation.

Regarding pages P3 and P4, there are no printing pages for the second printing apparatus 40. Accordingly, "NO" is set as to whether the first inverting unit 32 needs to perform the inverting operation, so that the sheets S will pass by the second printing unit 42 with the back sides set as printing sides because the sheets S are inverted once for the both-side printing performed by the first printing apparatus 20.

Regarding pages P5 and P6, page P5, i.e., a front side, is set as a printing page for the second printing apparatus 40, and the back side has been set as a printing side for the first printing apparatus 20 because the sheet S is inverted once for both-side printing. Accordingly, "YES" is set as to whether the first inverting unit 32 needs to perform the inverting operation.

As depicted in FIG. 6, for each of the pairs of pages P1 and P2, pages P3 and P4, pages P5 and P6, and pages P7 and P8, i.e., page pairs each corresponding to the front and back sides of a single sheet S, the second printing apparatus 40 determines, on the basis of the print mode for the second printing data received from the print control apparatus 100 depicted in FIG. 2, which of the front and back sides of the sheet S the printing page on one side in the second printing data indicates (which of the front and back sides are indicated for the printing to be performed by the second printing apparatus 40). Meanwhile, the second printing apparatus 40 receives a print mode for the first printing data from the first printing apparatus 20 (e.g., information indicating which of both-side printing or one-side printing is to be performed by the first printing apparatus 20).

The control unit 44 of the second printing apparatus 40 determines whether the second inverting unit 52 needs to perform the inverting operation, at least on the basis of which of the front or back side of a sheet S the printing page on one side in the second printing data indicates.

For example, the control unit 44 may determine whether the second inverting unit 52 needs to perform the inverting operation on the basis of three factors: which of the front or back side of a sheet S the printing page on one side in the second printing data indicates, which of both-side printing or one-side printing the first printing data is directed to, and which of the facedown ejection scheme or the faceup ejection scheme is to be used.

As depicted in FIG. 6, regarding whether the second inverting unit 52 needs to perform the inverting operation, the control unit 44 may make the same determination as the determination that is made as to whether the first inverting unit 32 needs to perform the inverting operation. Accordingly, the control unit 44 may determine whether the second inverting unit 52 needs to perform the inverting operation, on the basis of whether the first inverting unit 32 needs to perform the inverting operation. Alternatively, regarding whether the second inverting unit 52 needs to perform the inverting operation, the control unit 44 may make the same determination as the determination made by the control unit 28 as to whether the first inverting unit 32 needs to perform the inverting operation, i.e., the control unit 44 may make the determination on the basis of which of the front or back side of a sheet S the printing page on one side in the second printing data indicates.

The descriptions above have been given for the control operation wherein when the second printing unit 42 performs printing on sheets S on the basis of second printing data directed to one-side printing, the control unit 28 of the first printing apparatus 20 determines on the basis of the second printing data whether the first inverting unit 32 needs to perform the inverting operation. However, when the second printing apparatus 40 includes, as with the first printing apparatus 20, transportation-path switching units 24 and 25, a switchback roller pair 26, a paper ejection mount 27, and the like (circulation transportation path and inversion transportation path) and thus can perform both-printing on sheets S, the control unit 28 of the first printing apparatus 20 may perform control operations in accordance with the variation depicted in FIGS. 11-14 on the basis of second printing data directed to both-side printing.

This variation is different from the above-described example indicated in FIGS. 3-6 only in that, as depicted in FIG. 11, the pages P1 and P7 of image data in second printing data received by the second printing apparatus 40 are not blank pages but printing pages. Accordingly, descriptions of matters that have already been described above are omitted herein.

As depicted in FIG. 11, the image data in the second printing data directed to both-side printing indicates the pages P1 and P2 of the first sheet S, the page P5 of the third sheet S, and the pages P7 and P8 of the fourth sheet S, of which the front-side pages P1, P5, and P7 are printing pages. There are no printing pages for the pages P3 and P4 of the second sheet S. Meanwhile, all of pages P1, P2, P7, and P8 are printing pages.

Back sides are set as printing sides (upper sides) for the first printing apparatus 20 because the sheets S are inverted once for both-side printing. Accordingly, the control unit 28 sets "YES" for the second printing data as to whether the first inverting unit 32 needs to perform the inverting operation for pages P1 and P2, pages P5 and P6, and pages P7 and P8, i.e., the pages of which the front sides are to be set as printing pages.

Regarding pages P3 and P4, the second printing data indicates no printing pages. Accordingly, the control unit 28 sets "NO" as to whether the first inverting unit 32 needs to perform the inverting operation, so that the sheets S will pass by the second printing unit 42 with the back sides set as printing pages because the sheets S are inverted once for the both-side printing performed by the first printing apparatus 20.

As described above, for a situation in which second printing data indicates both-side printing pages or indicates only front-side printing pages and a situation in which the second printing data indicates only backs-side printing pages, the control unit 28 of the first printing apparatus 20 makes opposite determinations as to whether the first inverting unit 32 needs to perform the inverting operation.

As described above, the control unit 28 may determine whether the first inverting unit 32 needs to perform the inverting operation on the basis of whether the second printing data indicates a printing page for the front or back side of a sheet S. Accordingly, the second printing data is not limited to one-side printing but may be directed to both-side printing.

In this embodiment, the second printing apparatus 40 performs printing on the back sides of the first and fourth sheets S. Neither of the front and back sides of the second sheet S undergo printing, and the second sheet S passes by the second printing unit 42 with the back side thereof as an upper side. Only the front side of the third sheet S undergoes printing, and the third sheet S is transported via the circulation transportation path and inversion transportation path of the second printing apparatus 40 and passes by the second printing unit 42 again. Accordingly, the control unit 44 of the second printing apparatus 40 may set "NO" for all of the sheets S as to whether the second inverting unit 52 needs to perform the inverting operation.

However, after performing printing on page P5, i.e., the front side of the third sheet S, the second printing apparatus 40 does not perform printing on page P6, i.e., the back side of the third sheet S; hence, after printing is performed on the front side of the third sheet S, the third sheet S may be transported directly to the second inverting apparatus 50 without being transported again to the second printing unit 42 via the circulation transportation path and the inversion transportation path of the second printing apparatus. In this case, regarding whether the second inverting unit 52 needs to perform the inverting operation, a setting that is opposite to a setting that would be made if the third sheet S was transported via the circulation transportation path and the inversion transportation path of the second printing apparatus 40 may be made (set "YES" in opposition to "NO").

Next, descriptions will be given in the following of operations performed by the printing system 1 when a faceup ejection scheme (printing order) is used, i.e., when an ejection scheme is used wherein sheets S are ejected onto the paper ejection mount 61 in a manner such that sheets S with a lower page number are located at higher levels over the paper ejection mount 61 by performing printing in an order starting from the highest page number.

Figure 8:
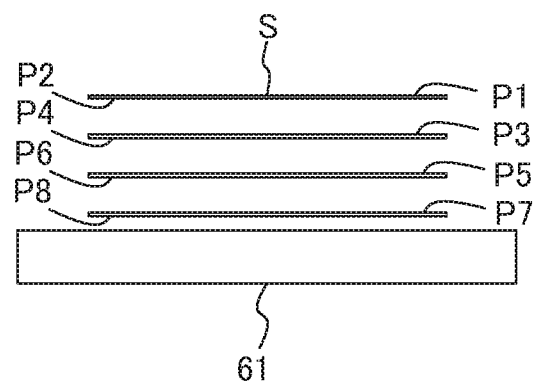
FIG. 8 is an explanatory diagram indicating a sheet ejection state achieved when a faceup ejection scheme is used in an embodiment.
Figure 12:
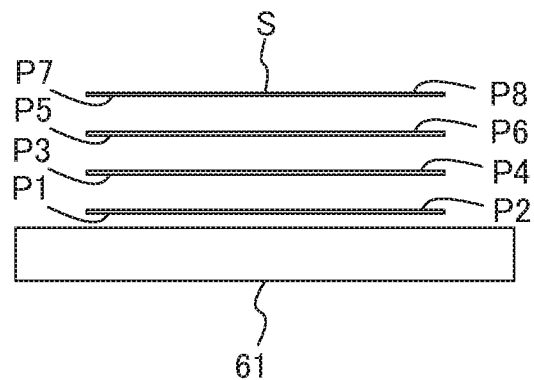
FIG. 12 is an explanatory diagram indicating a sheet ejection state achieved when a facedown ejection scheme is used in an embodiment.

FIG. 7 is an explanatory diagram indicating image data received by the first printing apparatus 20 and the second printing apparatus 40 when the faceup ejection scheme is used. FIG. 8 is an explanatory diagram indicating a sheet ejection state achieved when the faceup ejection scheme is used.

As depicted in FIG. 7, the image data of first printing data received by the first printing apparatus 20 includes image data of pages P8-P1, of which pages P7 and P6 are nonprinting pages, i.e., blank pages having no objects to be printed. When the first printing apparatus 20 performs both-side printing on the sheets S, printing is performed starting from page P8, i.e., performed in an order opposite to the order that would be adopted if the facedown ejection scheme was used (page P1 would initially undergo printing). Hence, image data of pages P8, P6, P4, and P2 are printed on the front sides of the first to fourth sheets S, and image data of pages P7, P5, P3, and P1 are printed on the back sides of the first to fourth sheets S.

After performing printing for page P8, i.e., the front side of the first sheet S, the first printing apparatus 20 does not perform printing for the back side of the first sheet S. Hence, the first printing apparatus 20 may transport the first sheet S to the first inverting apparatus 30 without transporting this sheet again to the first printing unit 22 via the circulation transportation path R2 and the inversion transportation path R3. However, the present embodiment is described herein with reference to an example in which even when printing is not performed for the back side of the first sheet S, this sheet is transported again to the first printing unit 22 via the circulation transportation path R2 and the inversion transportation path R3. When the first sheet S is transported directly to the first inverting apparatus 30 after printing is performed for page P8, i.e., the front side of the first sheet S, "YES" or "NO" may be set as to whether the first inverting unit 32 needs to perform the inverting operation, in a manner opposite to the manner in which "YES" or "NO" would be set if the third sheet S was transported to the circulation transportation path R2 and the inversion transportation path R3 ("NO" is set in opposition to "YES", or "YES" is set in opposition to "NO").

The second printing apparatus 40 performs one-side printing on the sheets S. The print control apparatus 100 generates image data of second printing data with blank pages inserted into nonprinting pages (P7, P6, P4, P3, P1) for which printing is not to be performed, whereby the image data of the second printing data has as many pages as the first printing data directed to both-side printing (has pages P8-P1). Thus, the printing pages, i.e., the pages other than the nonprinting pages, are pages P8, P5, and P2.

As depicted in FIG. 8, the four sheets S with pages P8-P1 having undergone printing are placed on the paper ejection mount 61 of the paper ejecting apparatus 60 with the bottom side of the lowermost sheet S being page P8 and the upper side of the uppermost sheet S being page P1.

FIG. 9 illustrates a table indicating determination conditions referred to by the first printing apparatus 20 when the faceup ejection scheme is used. FIG. 10 illustrates a table indicating determination conditions referred to by the second printing apparatus 40 when the faceup ejection scheme.

As depicted in FIG. 9, the first printing apparatus 20 receives, from the print control apparatus 100 depicted in FIG. 2, second printing data in addition to first printing data that includes image data and a print mode. The first printing apparatus 20 may receive the second printing data indirectly from the print control apparatus 100 via the second printing apparatus 40. The second printing data received by the first printing apparatus 20 may include image data alone.

The control unit 28 of the first printing apparatus 20 refers to the image data in the second printing data so as to determine whether the first inverting unit 32 needs to perform the inverting operation, at least on the basis of which of the front or back side of a sheet S the printing page on one side in the second printing data indicates.

For example, the control unit 28 may determine whether the first inverting unit 32 needs to perform the inverting operation on the basis of three factors: which of the front or back side of a sheet S the printing page on one side in the second printing data indicates, which of both-side printing or one-side printing the first printing data is directed to, and which of the facedown ejection scheme or the faceup ejection scheme is to be used.

In the example indicated in FIG. 9, the first printing apparatus 20 performs both-side printing, and the faceup ejection scheme is used. Hence, the control unit 28 determines whether the first inverting unit 32 needs to perform the inverting operation, in the manner described in the following.

Regarding pages P7, P8, P1, and P2, as depicted in FIG. 9, pages P8 and P2, i.e., front sides, are set as printing pages for the second printing apparatus 40. The back sides are set as printing sides (upper sides) for the first printing apparatus 20 because the sheets S are inverted once for both-side printing. Accordingly, the control unit 28 sets "YES" as to whether the first inverting unit 32 needs to perform the inverting operation.

Regarding pages P3 and P4, there are no printing pages for the second printing apparatus 40. Accordingly, "NO" is set as to whether the first inverting unit 32 needs to perform the inverting operation, so that the sheets S will pass by the second printing unit 42 with the back sides set as printing sides because the sheets S are inverted once for the both-side printing performed by the first printing apparatus 20.

Regarding pages P5 and P6, page P5, i.e., a back side, is set as a printing page for the second printing apparatus 40, and the back side has been set as a printing side for the first printing apparatus 20 because the sheet S is inverted once for both-side printing. Accordingly, "NO" is set as to whether the first inverting unit 32 needs to perform the inverting operation.

As depicted in FIG. 10, for each of the pairs of pages P8 and P7, pages P6 and P5, pages P4 and P3, and pages P2 and P1, i.e., page pairs each corresponding to the front and back sides of a single sheet S, the second printing apparatus 40 determines on the basis of the second printing data received from the print control apparatus 100 depicted in FIG. 2 which of the front and back sides of the sheet S the printing page on one side in the second printing data indicates (which of the front and back sides are indicated for the printing to be performed by the second printing apparatus 40). Meanwhile, the second printing apparatus 40 receives a print mode for the first printing data from the first printing apparatus 20 (e.g., information indicating which of both-side printing or one-side printing is to be performed by the first printing apparatus 20).

The control unit 44 of the second printing apparatus 40 determines whether the second inverting unit 52 needs to perform the inverting operation, at least on the basis of which of the front or back side of a sheet S the printing page on one side in the second printing data indicates.

For example, the control unit 44 may determine whether the second inverting unit 52 needs to perform the inverting operation on the basis of three factors: which of the front or back side of a sheet S the printing page on one side in the second printing data indicates, which of both-side printing or one-side printing the first printing data is directed to, and which of the facedown ejection scheme or the faceup ejection scheme is to be used.

As depicted in FIG. 10, regarding whether the second inverting unit 52 needs to perform the inverting operation, the control unit 44 may make the same determination as a determination that is made as to whether the first inverting unit 32 needs to perform the inverting operation. Accordingly, the control unit 44 may determine whether the second inverting unit 52 needs to perform the inverting operation, on the basis of whether the first inverting unit 32 needs to perform the inverting operation. Alternatively, regarding whether the second inverting unit 52 needs to perform the inverting operation, the control unit 44 may make the same determination as a determination made by the control unit 28 as to whether the first inverting unit 32 needs to perform the inverting operation, i.e., the control unit 44 may make the determination on the basis of which of the front or back side of a sheet S the printing page on one side in the second printing data indicates.

In the embodiments described above, the printing system 1 includes: the first printing unit 22, which performs printing on a sheet S (an exemplary medium) on the basis of first printing data; the first inverting unit 32, which is located downstream from the first printing unit 22 in a transportation direction specific to the sheet S and performs an inverting operation that is an operation of inverting the front and back sides of the sheet S; the second printing unit 42, which is located downstream from the first inverting unit 32 in the transportation direction and performs printing on the sheet S on the basis of second printing data; and the control unit 28, which determines whether the first inverting unit 32 needs to perform the inverting operation on the basis of whether the second printing data indicates a printing page for the front or back side of the sheet S. For example, the second printing unit 42 may perform printing on one side among the front and back sides of a sheet S on the basis of second printing data, and the control unit 28 determine whether the first inverting unit 32 needs to perform the inverting operation, on the basis of which of the front or back side of the medium the printing page of one side in the second printing data indicates.

Accordingly, the control unit 28 may determine whether the first inverting unit 32 needs to perform the inverting operation, in accordance with the details of printing performed by the second printing apparatus 40. Thus, editions can be performed with a desired page configuration and editing tasks to be performed by the user can be omitted in comparison with a situation in which in order for, for example, "YES" to be always set as to whether the first inverting unit 32 needs to perform the inverting operation, the user edits the page configuration to achieve image data conforming to a particular form with a fixed number of pages. Meanwhile, if the print control apparatus 100 determines whether the first inverting unit 32 needs to perform the inverting operation, control will need to be performed in accordance with the apparatus configuration of the printing system 1, thereby leading to complicated control operations; by contrast, the control unit 28 determining whether the inverting operation needs to be performed will prevent control operations to be performed by the print control apparatus 100 from becoming complicated. In the present embodiment, accordingly, whether the first inverting unit 32 disposed between the first printing unit 22 and the second printing unit 42 needs to perform the inventing operation can be determined through simple control operations without imposing a burden on the user. Preventing control operations to be performed by the print control apparatus 100 from becoming complicated allows the print control apparatus 100 to use processing resources intensively on image processing for first and second printing data, so that a reduction in the processing capacity for image processing for the first and second printing data can be minimized while avoiding occurrence of any fault and preventing development costs from being increased.

In the present embodiment, the print control apparatus 100 generates first and second printing data. When the first printing data is directed to both-side printing, the print control apparatus 100 generates the second printing data with blank pages inserted into nonprinting pages (P1, P3, P4, P6, P7), whereby the second printing data has as many pages as the first printing data. Accordingly, the control unit 28 can determine whether the first inverting unit 32 needs to perform the inverting operation, by referring to the printing-page information included in the second printing data in consideration of the printing-page information included in the first printing data. Hence, whether the first inverting unit 32 needs to perform the inventing operation can be determined through simpler control operations.

In the present embodiment, the control unit 28 determines whether the first inverting unit 32 needs to perform the inverting operation, on the basis of whether second printing data indicates a printing page for the front or back side of a sheet S and which of both-side printing or one-side printing first printing data is directed to. Hence, the first printing apparatus 20 can selectively perform both-side printing and one-side printing, so that whether the first inverting unit 32 needs to perform the inverting operation can be determined irrespective of which of the front or back side of a sheet S transported to the first inverting unit 32 is facing upward.

In the present embodiment, the printing system 1 further includes the second inverting unit 52, which is located downstream from the second printing unit 42 in the transportation direction and performs an inverting operation that is an operation of inverting the front and back sides of a sheet S; and the control unit 44 determines whether the second inverting unit 52 needs to perform the inverting operation, on the basis of whether second printing data indicates a printing page for the front or back side of the sheet S. Accordingly, whether the second inverting unit 52 needs to perform the inverting operation can be determined as with whether the first inverting unit 32 needs to perform the inverting operation, so that sheets S can be placed on the paper ejection mount 61 of the paper ejecting apparatus 60 with desired sides among the front and back sides of the sheets S facing upward or downward.

The present invention is not simply limited to the embodiments described herein. Components of the embodiments may be embodied in a varied manner in an implementation phase without departing from the gist of the invention. A plurality of components disclosed with reference to the described embodiments may be combined, as appropriate, to achieve various inventions. For example, all of the components indicated with reference to embodiments may be combined as appropriate. Accordingly, various variations and applications can be provided, as a matter of fact, without departing from the gist of the invention. The following indicates, as appendixes, the inventions recited in the claims at the time of filing of the present application.

According to one aspect, the application relates to a A printing system comprising:
a first printing unit that performs printing on a medium on the basis of first printing data;
a first inventing unit that is located downstream from the first printing unit in a transportation direction specific to the medium and performs an inverting operation that is an operation of inverting front and back sides of the medium;
a second printing unit that is located downstream from the first inverting unit in the transportation direction and performs printing on the medium on the basis of second printing data; and
a control unit that determines whether the first inverting unit needs to perform the inverting operation, on the basis of whether the second printing data indicates a printing page for the front or back side of the medium.

According to another aspect, in the printing system
the second printing unit performs printing on one side among the front and back sides of the medium on the basis of the second printing data, and
the control unit determines whether the first inverting unit needs to perform the inverting operation, on the basis of which of the front or back side of the medium a printing page on the one side in the second printing data indicates.

According to another aspect, in the printing system
the first and second printing data are generated by a print control apparatus, and
when the first printing data is directed to both-side printing, the print control apparatus generates the second printing data with blank pages inserted into nonprinting pages, whereby the second printing data has as many pages as the first printing data.

According to another aspect, in the printing system
the control unit determines whether the first inverting unit needs to perform the inverting operation, on the basis of whether the second printing data indicates a printing page for the front or back side of the medium and which of both-side printing or one-side printing the first printing data is directed to.

According to another aspect, the printing system further comprises
a second inverting unit that is located downstream from the second printing unit in the transportation direction and performs an inverting operation that is an operation of inverting the front and back sides of the medium, wherein
the control unit determines whether the second inverting unit needs to perform the inverting operation, on the basis of whether the second printing data indicates a printing page for the front or back side of the medium.

What is claimed is:
1. A printing system comprising:
a first printing unit that performs printing on a medium on the basis of first printing data;
a first inverting unit that is located downstream from the first printing unit in a transportation direction specific to the medium and performs an inverting operation that is an operation of inverting front and back sides of the medium;
a second printing unit that is located downstream from the first inverting unit in the transportation direction and performs printing on the medium on the basis of second printing data; and
a control unit that determines whether the first inverting unit needs to perform the inverting operation, on the basis of whether the second printing data indicates printing of a printing page on the front or back side of the medium, wherein
the second printing unit performs printing on one side among the front and back sides of the medium on the basis of the second printing data,
the control unit determines whether the first inverting unit needs to perform the inverting operation, on the basis of which of the front or back side of the medium the second printing data indicates printing will occur, the first and second printing data are generated by a print control apparatus, and when the first printing data is directed to both-side printing, the print control apparatus generates the second printing data with blank pages inserted into nonprinting pages, whereby the second printing data has as many pages as the first printing data.

2. The printing system of claim 1, wherein
the control unit determines whether the first inverting unit needs to perform the inverting operation, on the basis of whether the second printing data indicates a printing page for the front or back side of the medium and which of both-side printing or one-side printing the first printing data is directed to.

3. The printing system of claim 2, further comprising:
a second inverting unit that is located downstream from the second printing unit in the transportation direction and performs an inverting operation that is an operation of inverting the front and back sides of the medium, wherein
the control unit determines whether the second inverting unit needs to perform the inverting operation, on the basis of whether the second printing data indicates a printing page for the front or back side of the medium.

4. The printing system of claim 1, further comprising:
a second inverting unit that is located downstream from the second printing unit in the transportation direction and performs an inverting operation that is an operation of inverting the front and back sides of the medium, wherein
the control unit determines whether the second inverting unit needs to perform the inverting operation, on the basis of whether the second printing data indicates a printing page for the front or back side of the medium.

5. A printing system comprising:
a first printing unit that performs printing on a medium on the basis of first printing data;
a first inverting unit that is located downstream from the first printing unit in a transportation direction specific to the medium and performs an inverting operation that is an operation of inverting front and back sides of the medium;
a second printing unit that is located downstream from the first inverting unit in the transportation direction and performs printing on the medium on the basis of second printing data;
a control unit that determines whether the first inverting unit needs to perform the inverting operation, on the basis of whether the second printing data indicates printing of a printing page on the front or back side of the medium; and
a second inverting unit that is located downstream from the second printing unit in the transportation direction and performs an inverting operation that is an operation of
inverting the front and back sides of the medium, and wherein
the control unit determines whether the second inverting unit needs to perform the inverting operation, on the basis of whether the second printing data indicates printing of a
printing page on the front or back side of the medium.

6. The printing system of claim 5, wherein
the second printing unit performs printing on one side among the front and back sides of the medium on the basis of the second printing data, and
the control unit determines whether the first inverting unit needs to perform the inverting operation, on the basis of which of the front side or the back side of the medium the second printing data indicates printing will occur.

7. The printing system of claim 5, wherein the control unit determines whether the first inverting unit needs to perform the inverting operation, on the basis of whether the second printing data indicates printing of a printing page on the front or back side of the medium, and which of both-side printing or one-side printing the first printing data is directed to.

* * * * *